US011640880B2

(12) United States Patent
Maeda et al.

(10) Patent No.: US 11,640,880 B2
(45) Date of Patent: May 2, 2023

(54) ENERGY STORAGE DEVICE (71) Applicant: GS Yuasa International Ltd., Kyoto (JP)

(72) Inventors: Kazuto Maeda, Kyoto (JP); Hirokazu Kambayashi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 235 days.

(21) Appl. No.: 16/769,939

(22) PCT Filed: Nov. 29, 2018

(86) PCT No.: PCT/JP2018/044032
§ 371 (c)(1),
(2) Date: Jun. 4, 2020

(87) PCT Pub. No.: WO2019/116914
PCT Pub. Date: Jun. 20, 2019

(65) Prior Publication Data
US 2020/0335738 A1 Oct. 22, 2020

(30) Foreign Application Priority Data
Dec. 12, 2017 (JP) .............................. JP2017-237584

(51) Int. Cl.
H01G 11/18 (2013.01)
H01G 11/14 (2013.01)
(Continued)

(52) U.S. Cl.
CPC ............ H01G 11/18 (2013.01); H01G 11/14 (2013.01); H01G 11/78 (2013.01);
(Continued)

(58) Field of Classification Search
CPC ................................ H01G 11/78; H01G 11/80
See application file for complete search history.

(56) References Cited

U.S. PATENT DOCUMENTS

2014/0220395 A1 8/2014 Ootsuka
2014/0227564 A1 8/2014 Song et al.
(Continued)

FOREIGN PATENT DOCUMENTS

JP 2000-260410 A 9/2000
JP 2002-063888 A 2/2002
(Continued)

OTHER PUBLICATIONS

International Search Report (ISR) (PCT Form PCT/ISA/210), in PCT/JP2018/044032, dated Feb. 26, 2019.

Primary Examiner — Eric W Thomas
(74) Attorney, Agent, or Firm — McGinn I.P. Law Group, PLLC.

(57) ABSTRACT

An energy storage device includes: a case including a case body and a lid; and electrode terminals (positive electrode terminal, negative electrode terminal) fixed to the lid. A junction portion for joining the case body and the lid to each other is formed on a surface of the case on an electrode terminal side. The lid includes recessed portions disposed along and adjacent to the junction portion without being disposed between the electrode terminal and the junction portion.

20 Claims, 6 Drawing Sheets (51) Int. Cl.
  *H01G 11/78* (2013.01)
  *H01M 50/342* (2021.01)
  *H01M 50/147* (2021.01)
  H01M 50/103 (2021.01)
  H01M 50/562 (2021.01)
  H01M 50/553 (2021.01)
  H01M 50/55 (2021.01)

(52) U.S. Cl.
  CPC ..... *H01M 50/147* (2021.01); *H01M 50/3425* (2021.01); *H01M 50/103* (2021.01); *H01M 50/55* (2021.01); *H01M 50/553* (2021.01); *H01M 50/562* (2021.01)

(56) References Cited

U.S. PATENT DOCUMENTS

| | | |
|---|---|---|
| 2014/0255758 A1 | 9/2014 | Tsutsumi et al. |
| 2015/0228936 A1 | 8/2015 | Kajiwara et al. |
| 2017/0092905 A1 | 3/2017 | Tsutsumi et al. |
| 2017/0179451 A1 | 6/2017 | Ootsuka |
| 2017/0256774 A1* | 9/2017 | Iwasaki ............... H01M 50/183 |
| 2017/0338448 A1 | 11/2017 | Kajiwara et al. |
| 2018/0351153 A1* | 12/2018 | Nakamura ............. H01G 11/16 |
| 2019/0299332 A1 | 10/2019 | Ogawa |

FOREIGN PATENT DOCUMENTS

| | | |
|---|---|---|
| JP | 2002-367583 A | 12/2002 |
| JP | 2007-179793 A | 7/2007 |
| JP | 2011-049122 A | 3/2011 |
| JP | 2014-041770 A | 3/2014 |
| JP | 2014-160617 A | 9/2014 |
| JP | 2014-182949 A | 9/2014 |
| JP | 2017-191683 A | 10/2017 |
| JP | 2018-010815 A | 1/2018 |
| WO | WO 2010/146700 A1 | 12/2010 |
| WO | WO 2013/021939 A1 | 2/2013 |
| WO | WO 2014/033906 A1 | 3/2014 |

* cited by examiner

Fig. 7 ing a case body and a lid has
ENERGY STORAGE DEVICE

TECHNICAL FIELD

The present invention relates to an energy storage device which includes a case including a case body and a lid.

BACKGROUND ART

Conventionally, an energy storage device including a case including a case body and a lid joined to the case body has been widely known. For example, Patent Document 1 discloses an energy storage device (prismatic secondary battery) in which a lid (battery lid) is welded to a case body (battery case) to form a welded portion over the entire circumference of the periphery end of the lid, thereby sealing an opening portion of the case body with the lid.

PRIOR ART DOCUMENT

Patent Document

Patent Document 1: WO 2014/033906

SUMMARY OF THE INVENTION

Problems to be Solved by the Invention

The conventional energy storage device may not be accurately configured.

An object of the present invention is to provide an energy storage device which can be accurately configured.

Means for Solving the Problems

An energy storage device according to one aspect of the present invention includes: a case including a case body and a lid; and an electrode terminal fixed to the lid. A junction portion for joining the case body and the lid to each other is formed on a surface of the case on an electrode terminal side. The lid includes a recessed portion disposed along and adjacent to the junction portion without being disposed between the electrode terminal and the junction portion.

The present invention can be realized not only as an energy storage device but also as a case or a lid of the case which are included in the energy storage device.

Advantages of the Invention

The energy storage device in the present invention can be accurately configured.

MODE FOR CARRYING OUT THE INVENTION

The present inventors found that, if a lid is joined to a case body, and a first side of the periphery of the lid is joined to the case body, misalignment may occur between a second side facing the first side of the lid and the case body. For example, if the lid is joined to the case body by welding as in the energy storage device described in Patent Document 1, and the first side of the periphery of the lid is welded to the case body, a constrictive effect due to the solidification of a welded location may cause the second side facing the first side of the lid to be uplifted. Even another joining method may cause misalignment to occur between the second side of the lid and the case body. In such a case, the second side of the lid may not be accurately joined to the case body, or the lid may be fixed while it tilts, which makes it impossible to secure the flatness of the lid. Thus, the conventional energy storage device may not be accurately configured.

An energy storage device according to one aspect of the present invention includes: a case including a case body and a lid; and an electrode terminal fixed to the lid. A junction portion for joining the case body and the lid to each other is formed on a surface of the case on an electrode terminal side. The lid includes a recessed portion disposed along and adjacent to the junction portion without being disposed between the electrode terminal and the junction portion.

Therefore, in the energy storage device, the junction portion for joining the case body and the lid to each other is formed on the surface of the case on an electrode terminal side, and the lid includes the recessed portion disposed along and adjacent to the junction portion without being disposed between the electrode terminal and the junction portion. Thus, the recessed portion is formed along the junction portion in the vicinity of the junction portion of the lid, whereby, even if the first side of the lid is joined to the case body and the lid tilts, the recessed portion along the junction portion can absorb the tilt of the lid to suppress the tilt of the lid. Meanwhile, if a recessed portion is formed lateral to the position where the electrode terminal is disposed in the lid (between the electrode terminal and the junction portion), a force is applied to the lid during processing of the recessed portion, so that the flatness of the surface of the lid on which the electrode terminal is disposed may not be secured. Therefore, the recessed portion is not formed lateral to the electrode terminal (between the electrode terminal and the junction portion), whereby the flatness of the surface of the lid on which the electrode terminal is disposed can be secured. These make it possible to accurately configure the energy storage device.

The lid may further include a gas release valve, and the recessed portion may be disposed so as not to overlap with the gas release valve as viewed from an extending direction of the recessed portion.

Therefore, the recessed portion formed in the lid is disposed so as not to overlap with the gas release valve as viewed from the extending direction of the recessed portion.

When the recessed portion is disposed so as to overlap with the gas release valve (so as to intersect with the gas release valve when the recessed portion extends) as viewed from the extending direction of the recessed portion, the recessed portion may have an influence on the opening pressure (actuation pressure) of the gas release valve. Therefore, the recessed portion is disposed so as not to overlap with the gas release valve as viewed from the extending direction, which makes it possible to suppress the influence of the recessed portion on the opening pressure of the gas release valve. This makes it possible to accurately configure the energy storage device.

The recessed portion may be disposed at a position different from that between the gas release valve and the junction portion.

Therefore, the recessed portion formed in the lid is disposed at a position different from that between the gas release valve and the junction portion. The gas release valve is generally formed by decreasing the thickness of the lid, so that, if a recessed portion is formed lateral to the gas release valve (between the gas release valve and the junction portion), the recessed portion may have an influence on the processing accuracy of the gas release valve. Therefore, the recessed portion is not formed lateral to the gas release valve, so that the processing accuracy of the gas release valve can be secured. This makes it possible to accurately configure the energy storage device.

The recessed portion may be formed on an outer surface of the lid, and a protrusion extending along the recessed portion may be formed on an inner surface of the lid.

Therefore, the recessed portion formed in the lid is formed on the outer surface of the lid, and the protrusion extending along the recessed portion is formed on the inner surface of the lid. For example, when the outer surface of the lid is recessed to form the recessed portion, the inner surface of the lid can be projected to form the protrusion along the recessed portion. Therefore, by using the protrusion to position the lid and the case body, the lid can be positioned and joined to the case body, which can accurately configure the energy storage device.

The recessed portion may be formed by a groove portion extending along the junction portion.

Therefore, the recessed portion formed in the lid is formed by the groove portion extending along the junction portion. Thus, the recessed portion can be easily formed by processing the groove portion extending along the junction portion in the lid. This makes it possible to easily and accurately configure the energy storage device.

The recessed portion may be disposed so as to overlap with an internal space of the case as viewed from a normal direction of an outer surface of the lid.

Therefore, the recessed portion formed in the lid is disposed so as to overlap with the internal space of the case as viewed from the normal direction of the outer surface of the lid. Thus, the recessed portion is disposed so as to overlap with the internal space of the case, whereby the tilt of the lid can be easily absorbed by the recessed portion when the case body and the lid are joined to each other. This makes it possible to accurately configure the energy storage device.

Hereinafter, an energy storage device according to an embodiment (and modification examples thereof) of the present invention will be described with reference to drawings. The embodiment described hereinafter shows comprehensive or specific examples. In the embodiment described hereinafter, numerical values, shapes, materials, constituent elements, the disposing positions and connection states of the constituent elements, producing steps, and the order of producing steps and the like are merely examples, and these are not intended to be used for limiting the present invention. Among the constituent elements in the embodiment described hereinafter, the constituent elements which are not described in independent claims describing an uppermost concept are described as arbitrary constituent elements. In the respective drawings, dimensions and the like are not illustrated strictly.

In the description in the embodiment described hereinafter and drawings, an arrangement direction of a pair of electrode terminals (a positive electrode terminal and a negative electrode terminal) included in an energy storage device, an arrangement direction of a pair of current collectors (a positive electrode current collector and a negative electrode current collector) included in the energy storage device, an oppositely facing direction of short side surfaces of a case, or an extending direction (longitudinal direction) of a lid of the case is defined as an X axis direction. An oppositely facing direction of long side surfaces of the case, a short direction of the short side surface of the case, a short direction of the lid of the case, or a thickness direction of the case is defined as a Y axis direction. An arrangement direction of a case body and lid of the energy storage device, a thickness direction of the lid, or a longitudinal direction or vertical direction of the short side surface of the case is defined as a Z axis direction. The X axis direction, the Y axis direction, and the Z axis direction are directions intersecting with each other (orthogonal to each other in the present embodiment). There may be also a case where the Z axis direction does not agree with the vertical direction depending on a use state of the energy storage device. However, hereinafter, for the sake of convenience of description, the description is made by assuming that the Z axis direction agrees with the vertical direction. In the description made hereinafter, for example, a plus side in the X axis direction indicates an arrow direction side of an X axis, and a minus side in the X axis direction indicates a side opposite to the plus side in the X axis direction. The same applies to the Y axis direction and the Z axis direction.

Embodiment

1 Overall Description of Energy Storage Device 10

Figure 1:
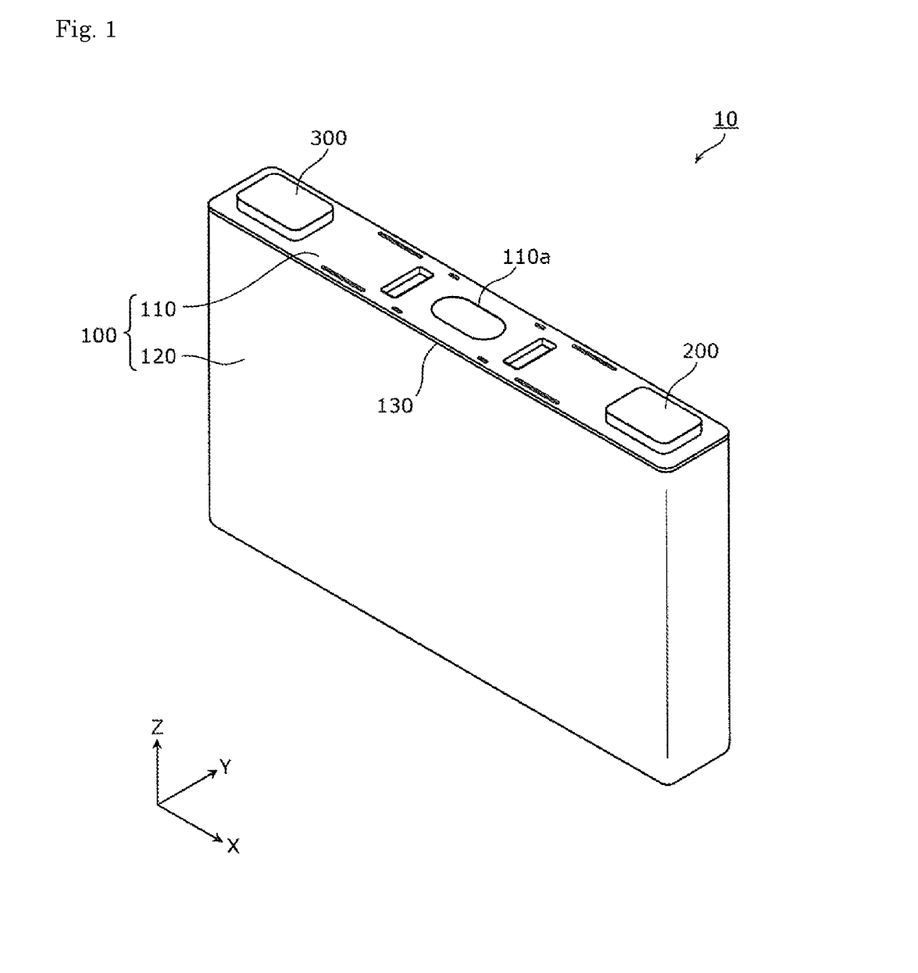
FIG. 1 is a perspective view showing the external appearance of an energy storage device according to an embodiment.
Figure 2:
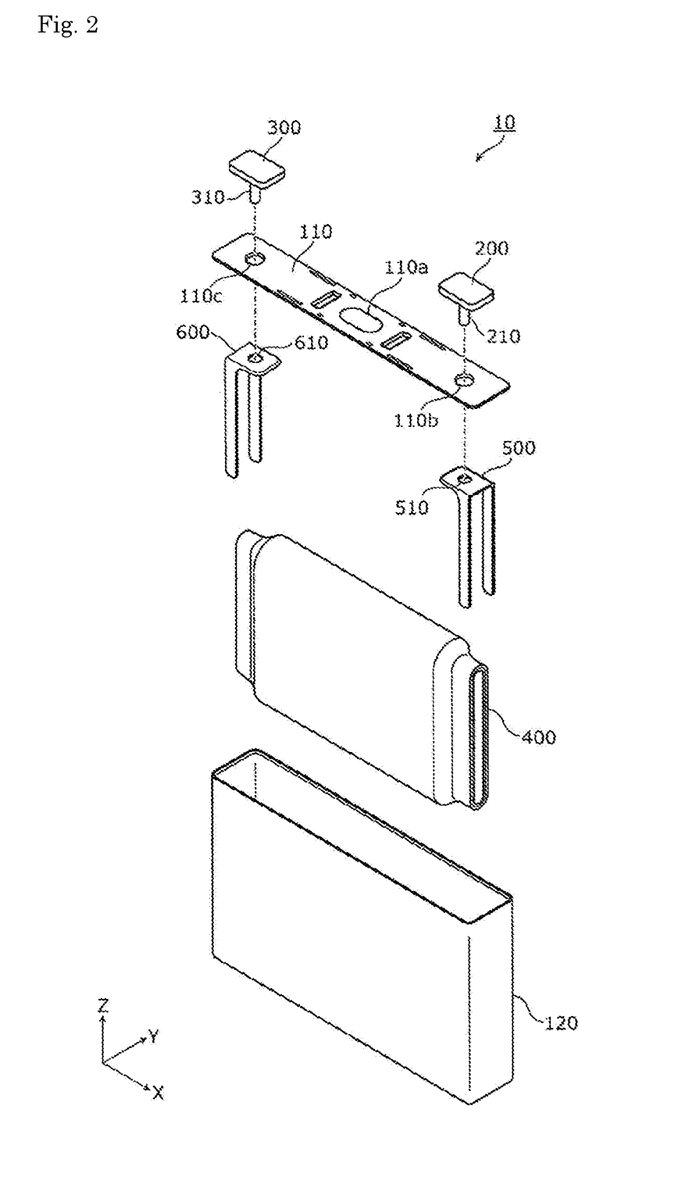
FIG. 2 is an exploded perspective view showing constituent elements included in the energy storage device according to the embodiment in an exploded manner.

First, the overall description of an energy storage device 10 in the present embodiment will be given with reference to FIGS. 1 and 2. FIG. 1 is a perspective view showing the external appearance of the energy storage device 10 according to the present embodiment. FIG. 2 is an exploded perspective view showing constituent elements included in the energy storage device 10 according to the present embodiment in an exploded manner.

The energy storage device 10 is a secondary battery which can charge electricity or discharge electricity. Specifically, the energy storage device 10 is a nonaqueous electrolyte secondary battery such as a lithium ion secondary battery. The energy storage device 10 is used as a power source for an automobile such as an electric vehicle (EV), a hybrid electric vehicle (HEV), or a plug-in hybrid electric vehicle (PHEV), a power source for electronic equipment, or a power source for power storage, or the like. The energy storage device 10 is not limited to a nonaqueous electrolyte secondary battery. The energy storage device 10 may be a secondary battery other than a nonaqueous electrolyte secondary battery, or may be a capacitor. The energy storage device 10 may not be a secondary battery, and may be a primary battery which allows a user to use stored electricity without being charged by the user. The energy storage device 10 may be a battery using a solid electrolyte. In the present embodiment, the rectangular parallelepiped (prismatic) energy storage device 10 is illustrated, but the shape of the energy storage device 10 is not limited to a rectangular parallelepiped shape, and may be a circular columnar shape or an elongated circular columnar shape or the like. The energy storage device may be a laminate type energy storage device.

As shown in FIG. 1, the energy storage device 10 includes: a case 100 including a lid 110 and a case body 120; a positive electrode terminal 200; and a negative electrode terminal 300. As shown in FIG. 2, an electrode assembly 400, a positive electrode current collector 500, and a negative electrode current collector 600 are housed in the case 100.

In order to improve insulation properties and airtightness, a gasket or the like is disposed between the lid 110 and the positive electrode terminal 200, and another gasket or the like is disposed between the lid 110 and the positive electrode current collector 500. The illustration of the gaskets is omitted. The same applies to a negative electrode side. An electrolyte solution (nonaqueous electrolyte) is sealed in the case 100, but the illustration of the electrolyte solution is omitted. The kind of the electrolyte solution is not particularly limited as long as the electrolyte solution does not impair the performance of the energy storage device 10, and various electrolyte solutions can be selected. Besides the constituent elements, a spacer disposed lateral to the positive electrode current collector 500 and the negative electrode current collector 600, an electrolyte solution filling portion for injecting an electrolyte solution into the case 100, or an insulation film which wraps the electrode assembly 400 and the like may be disposed.

The case 100 is a rectangular parallelepiped (prismatic) case including a case body 120 having an opening formed therein and a lid 110 closing the opening of the case body 120. The case body 120 is a member constituting the body portion of the case 100, having a rectangular tubular shape, and having a bottom. The case body 120 includes two flat plate-shaped and rectangular long side surface portions on both side surfaces in a Y axis direction, two flat plate-shaped and rectangular short side surface portions on both side surfaces in an X axis direction, and a flat plate-shaped and rectangular bottom face portion on a minus side in a Z axis direction. The lid 110 is a flat plate-shaped and rectangular member which constitutes a lid portion of the case 100 and extends in the X axis direction, and is disposed on the plus side of the case body 120 in the Z axis direction.

Specifically, the case 100 has an internal structure in which the electrode assembly 400 and the like is housed in the case body 120, and the case body 120 and the lid 110 are then joined by welding or the like to form a junction portion 130 for sealing the case body 120. That is, on the side surfaces of the case 100 (the surfaces on both sides in the X axis direction and both sides in the Y axis direction), the junction portion 130 for joining the case body 120 and the lid 110 to each other is formed. The material of the case 100 (the case body 120 and the lid 110) is not particularly limited, but it is preferably a weldable (joinable) metal such as stainless steel, aluminum, an aluminum alloy, iron, or a plated steel plate. It is preferable that the lid 110 and the case body 120 are composed of the same material, but these may be composed of different materials.

The lid 110 includes a gas release valve 110a at its center portion, an opening portion 110b in a plus side end portion in the X axis direction, and an opening portion 110c in a minus side end portion in the X axis direction. The gas release valve 110a is a portion (safety valve) which releases the internal pressure of the case 100 when the internal pressure of the case 100 rises. That is, the gas release valve 110a has a thin-walled portion. When the internal pressure of the case 100 reaches a predetermined opening pressure, the thin-walled portion is broken and opened, so that the internal pressure of the case 100 is released. The opening portions 110b and 110c are circular through holes for attaching the positive electrode terminal 200 and the negative electrode terminal 300 to the lid 110. The description of the configuration of the lid 110 will be described in more detail later.

The electrode assembly 400 is an energy storage device (power generating element) which includes a positive electrode plate, a negative electrode plate, and a separator and can store electricity. The positive electrode plate is an electrode plate in which a positive active material layer is formed on a positive electrode substrate layer which is an elongated belt-like current collector foil composed of aluminum or an aluminum alloy or the like. The negative electrode plate is an electrode plate in which a negative active material layer is formed on a negative electrode substrate layer which is an elongated belt-like current collector foil composed of copper or a copper alloy or the like. The separator is a microporous sheet composed of a resin or the like. The electrode assembly 400 is formed by winding the separator, the positive electrode plate, and the negative electrode plate with the separator disposed therebetween.

In the present embodiment, the elongated circular shape is illustrated as the cross-sectional shape of the electrode assembly 400, and examples thereof include an elliptical shape, a circular shape, and a polygonal shape. The electrode assembly 400 may be obtained by winding with an X axis direction as a winding axis as shown in FIG. 2, or may be obtained by winding with a Z axis direction as a winding axis. The electrode assembly 400 may be not a winding type electrode assembly but a laminated type electrode assembly in which flat electrode plates are laminated or a zigzag type electrode assembly in which electrode plates are folded in a zigzag manner.

The positive electrode terminal 200 is an electrode terminal electrically connected to the positive electrode plate of the electrode assembly 400. The negative electrode terminal 300 is an electrode terminal electrically connected to the negative electrode plate of the electrode assembly 400. That is, the positive electrode terminal 200 and the negative electrode terminal 300 are metal electrode terminals for leading the electricity stored in the electrode assembly 400 to the external space of the energy storage device 10, and introducing the electricity into the internal space of the energy storage device 10 in order to store the electricity in the electrode assembly 400. The positive electrode terminal 200 and the negative electrode terminal 300 are attached to the lid 110 disposed above the electrode assembly 400.

Specifically, as shown in FIG. 2, the positive electrode terminal 200 includes a shaft portion 210. The shaft portion 210 is inserted into the opening portion 110b of the lid 110 and an opening portion 510 of the positive electrode current collector 500, and is swaged, whereby the positive electrode terminal 200 is fixed to the lid 110 together with the positive electrode current collector 500. Similarly, the negative electrode terminal 300 includes a shaft portion 310. The shaft portion 310 is inserted into the opening portion 110c of the lid 110 and an opening portion 610 of the negative electrode current collector 600, and is swaged, whereby the negative electrode terminal 300 is fixed to the lid 110 together with the current collector 600. That is, the positive electrode terminal 200 and the negative electrode terminal 300 are fixed to the lid 110 in a state of penetrating the lid 110. In FIG. 2, the shapes of the shaft portions 210 and 310 before being swaged are illustrated.

The positive electrode current collector 500 and the negative electrode current collector 600 are disposed between the electrode assembly 400 and the side surface of the case 100. The positive electrode current collector 500 and the negative electrode current collector 600 are members having electrical conductivity and rigidity, and are electrically connected to the positive electrode terminal 200 and the negative electrode terminal 300, and the positive and negative electrode plates of the electrode assembly 400. The material of the positive electrode current collector 500 is not limited, but it is composed of aluminum or an aluminum alloy or the like as with the positive electrode substrate layer of the electrode assembly 400. The material of the negative electrode current collector 600 is also not limited, but it is composed of copper or a copper alloy or the like as with the negative electrode substrate layer of the electrode assembly 400.

2 Detailed Description of Configuration of Lid 110

Figure 3:
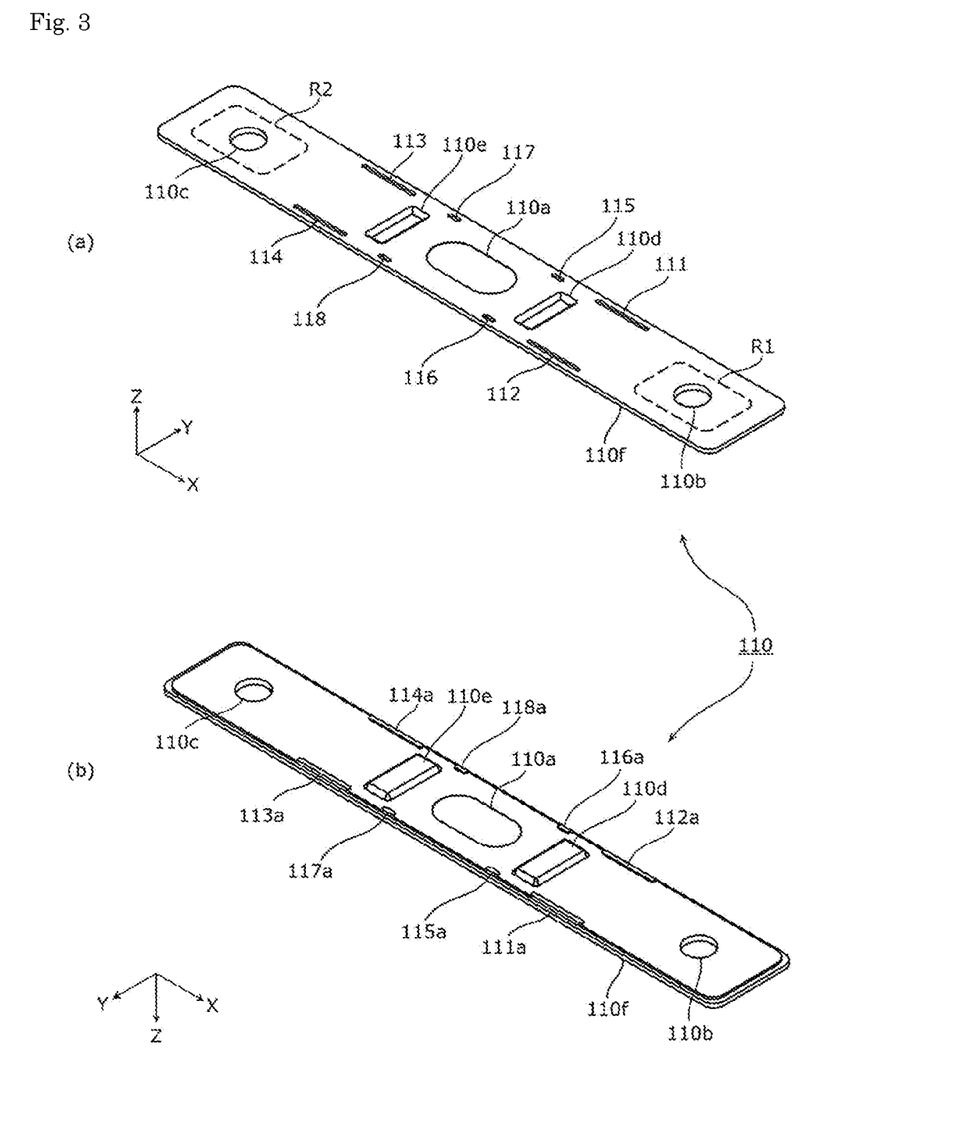
FIG. 3 is a perspective view showing the configuration of a lid according to the embodiment.
Figure 4:
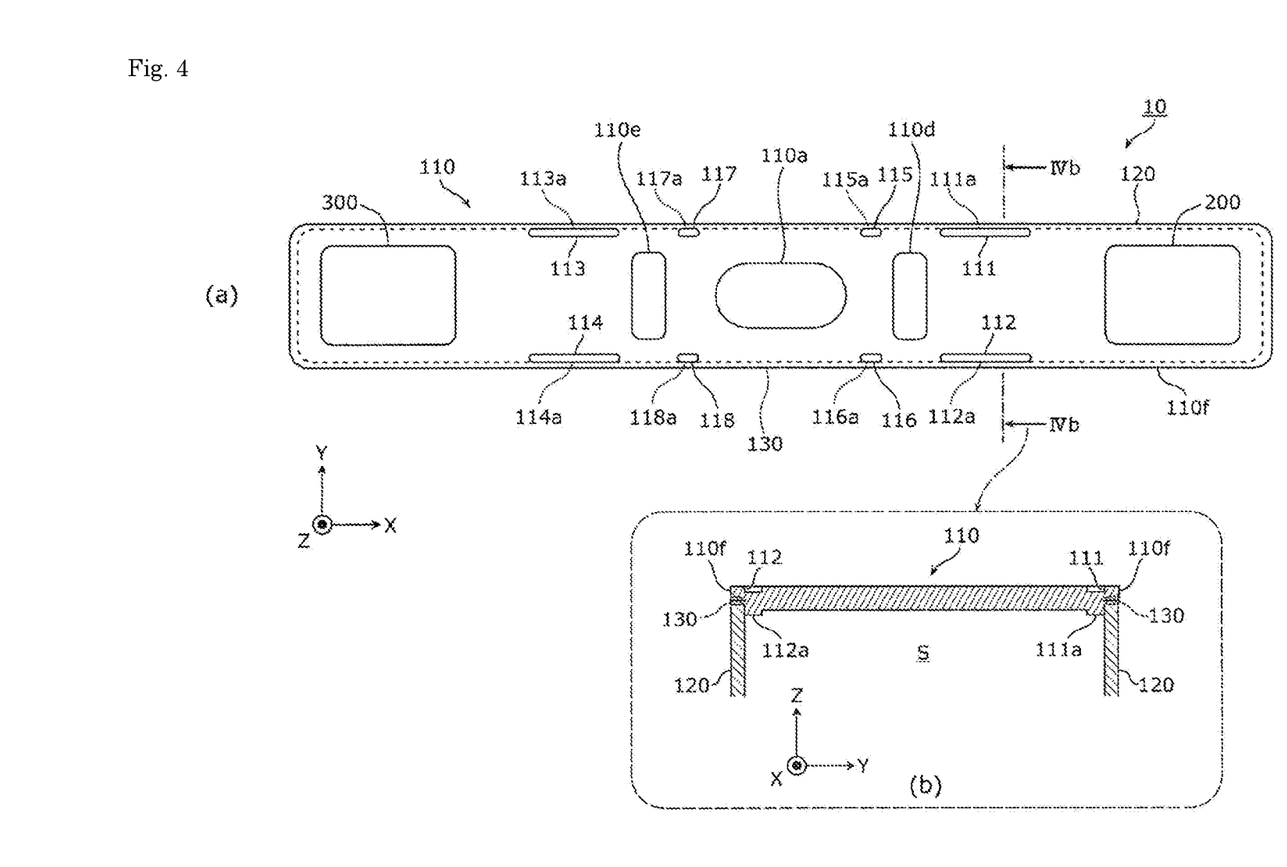
FIG. 4 is a plan view and a cross-sectional view showing a configuration in which the lid according to the embodiment is joined to a case body.

Next, the configuration of the lid 110 will be described in detail. FIG. 3 is a perspective view showing the configuration of the lid 110 according to the present embodiment. Specifically, FIG. 3(a) is an enlarged perspective view showing the configuration of the lid 110 in FIG. 2, and FIG. 3(b) is an enlarged perspective view showing the configuration of a back surface (a surface on a minus side in a Z axis direction) of the lid 110 in FIG. 2. FIG. 4 is a plan view and a cross-sectional view showing a configuration in which the lid 110 according to the present embodiment is joined to case body 120. Specifically, FIG. 4(a) is a plan view showing the configuration of the energy storage device 10 in FIG. 1 as viewed from a plus side in a Z axis direction, and FIG. 4(b) is a cross-sectional view showing a configuration in which the lid 110 and the case body 120 in FIG. 4(a) are cut along a IVb-IVb cross section.

As shown in FIGS. 4(a) and 4(b), the lid 110 includes, in addition to the above-described gas release valve 110a and opening portions 110b and 110c, bulging portions 110d and 110e, a periphery portion 110f, recessed portions 111 to 118, and protrusions 111a to 118a.

[2.1 Description of Configuration Other than Recessed Portions 111 to 118 and Protrusions 111a to 118a]

As described above, the gas release valve 110a is disposed at the central position of the lid 110 (the central position in the X axis direction and the central position in the Y axis direction). In the present embodiment, the gas release valve 110a is formed integrally with the lid 110. That is, the lid 110 in which the gas release valve 110a is formed can be produced by subjecting a plate material to press working or the like. Therefore, the gas release valve 110a is composed of the same material as that of the lid 110. The gas release valve 110a may be originally configured as a separate body from the lid 110. For example, the gas release valve 110a may be disposed at the central position of the lid 110 by forming an opening portion at the central position of the lid 110, fitting the gas release valve 110a into the opening portion, and joining the gas release valve 110a and the lid 110 to each other by welding or the like. In this case, the material of the gas release valve 110a is not particularly limited, and the gas release valve 110a may be composed of aluminum, an aluminum alloy, iron, copper, a copper alloy, stainless steel, a plated steel plate, plated copper, or a clad metal (Fe—Ni, Ni—Cu, Al—Ni) or the like.

The bulging portions 110d and 110e are rectangular portions in top view (viewed from the Z axis direction), and are disposed such that the gas release valve 110a is sandwiched between the bulging portions 110d and 110e in the X axis direction. The lid 110 has a recessed outer surface, and a projected inner surface. Specifically, the bulging portion 110d is disposed lateral to the plus side of the gas release valve 110a in the X axis direction, and is disposed so as to extend in the Y axis direction so as to cover the lateral side of the gas release valve 110a. The bulging portion 110e is disposed lateral to the minus side of the gas release valve 110a in the X axis direction, and is disposed so as to extend in the Y axis direction so as to cover the lateral side of the gas release valve 110a. Such a configuration causes the bulging portions 110d and 110e to reinforce the lateral strength of the gas release valve 110a to stabilize the opening pressure of the gas release valve 110a.

As described above, the opening portions 110b and 110c are through holes to which the positive electrode terminal 200 and the negative electrode terminal 300 are attached. That is, the positive electrode terminal 200 is attached to a rectangular terminal attachment region R1 around the opening portion 110b, and the negative electrode terminal 300 is attached to a rectangular terminal attachment region R2 around the opening portion 110c.

The periphery portion 110f is a stepped portion formed in the outer circumferential portion of the lid 110. Specifically, the periphery portion 110f is an annular portion formed over the entire circumference of the periphery portion of the lid 110. The inner surface of the periphery portion 110f is recessed to form a thin-walled portion. The periphery portion 110f is a portion which comes into contact with the case body 120 when the lid 110 is placed on the case body 120. That is, as shown in FIG. 4, when the lid 110 and the case body 120 are joined to each other, the periphery portion 110f and the case body 120 are joined to each other to form a junction portion 130.

[2.2 Description of Configuration of Recessed Portions 111 to 118]

The recessed portions 111 to 118 are recessed portions (recessed portions in which the outer surface is recessed) formed in the outer surface of the lid 110 (the surface on the plus side in the Z axis direction), and are disposed so as to extend along and adjacent to the periphery portion 110f. Specifically, the recessed portions 111 to 118 are formed by groove portions extending along the periphery portion 110f. In the present embodiment, the recessed portions 111 to 118 have a rectangular cross section (cross section cut in a YZ plane), but the cross sectional shape of each of the recessed portions 111 to 118 may be a triangular, trapezoidal, polygonal, semicircular, semielliptical, or semielliptical shape or the like, and is not particularly limited.

As described above, the junction portion 130 for joining the case body 120 and the lid 110 to each other is formed on the periphery portion 110f. That is, as shown in FIG. 4(b), for example, by irradiating the case 100 with a laser beam from the lateral side, the junction portion 130 for welding the case body 120 and the periphery portion 110f to each other is formed on the side surface of the case 100. Therefore, the recessed portions 111 to 118 are disposed along and adjacent to the junction portion 130. The recessed portions 111 to 118 are formed by groove portions extending along the junction portion 130. That is, the recessed portions 111, 113, 115, and 117 are groove portions extending along the junction portion 130 formed on the periphery portion 110*f* on plus side of the lid 110 in the Y axis direction. The recessed portions 112, 114, 116, and 118 are groove portions extending along the junction portion 130 formed on the periphery portion 110*f* on the minus side of the lid 110 in the Y axis direction.

As shown in FIG. 3, the recessed portions 111 to 118 are disposed so as not to overlap with the terminal attachment regions R1 and R2 as viewed from the extending direction of the recessed portions 111 to 118 (in the present embodiment, the X axis direction). The terminal attachment regions R1 and R2 are regions where the positive electrode terminal 200 and the negative electrode terminal 300 are attached. Therefore, as shown in FIG. 4, the recessed portions 111 to 118 are disposed so as not to overlap with the electrode terminals (the positive electrode terminal 200 and the negative electrode terminal 300) as viewed from the extending direction of the recessed portions 111 to 118 (X axis direction). For example, the recessed portions 111 and 112 are disposed so as not to intersect with the positive electrode terminal 200 (and the terminal attachment region R1) even when the recessed portions 111 and 112 are extended to the plus side in the X axis direction. The recessed portions 113 and 114 are disposed so as not to intersect with the negative electrode terminal 300 (and the terminal attachment region R2) even when the recessed portions 113 and 114 are extended to the minus side in the X axis direction.

The recessed portions 111 to 118 are disposed so as not to overlap with the gas release valve 110*a* and the bulging portions 110*d* and 110*e* as viewed from the extending direction of the recessed portions 111 to 118 (in the present embodiment, the X axis direction). For example, the recessed portions 115 and 116 are disposed so as not to intersect with the gas release valve 110*a* even when the recessed portions 115 and 116 are extended to the minus side in the X axis direction. The recessed portions 117 and 118 are disposed so as not to intersect with the gas release valve 110*a* even when the recessed portions 117 and 118 are extended to the plus side in the X axis direction. The recessed portions 111 and 112 are disposed so as not to intersect with the bulging portion 110*d* even when the recessed portions 111 and 112 are extended to the minus side in the X axis direction. The recessed portions 115 and 116 are disposed so as not to intersect with bulging portion 110*d* even when the recessed portions 115 and 116 are extended to the plus side in the X axis direction. The same applies to the bulging portion 110*e* side.

Furthermore, as shown in FIG. 3, the recessed portions 111 to 118 are disposed at positions different from those between the terminal attachment region R1 and the periphery portion 110*f* and between the terminal attachment region R2 and the periphery portion 110*f*. Therefore, as shown in FIG. 4, the recessed portions 111 to 118 are disposed at positions different from those between the electrode terminal and the junction portion 130 without being disposed between the electrode terminal (the positive electrode terminal 200 and the negative electrode terminal 300) and the junction portion 130. For example, the recessed portion 111 does not extend between the positive electrode terminal 200 (and the terminal attachment region R1) and the junction portion 130 (and the periphery portion 110*f*) on the plus side in the Y axis direction. The recessed portion 112 does not extend between the positive electrode terminal 200 (and the terminal attachment region R1) and the junction portion 130 (and the periphery portion 110*f*) on the minus side in the Y axis direction. The same applies to the negative electrode terminal 300 side.

As shown in FIG. 3, the recessed portions 111 to 118 are disposed at positions different from those between the gas release valve 110*a* and the periphery portion 110*f*, and between each of the bulging portions 110*d* and 110*e* and the periphery portion 110*f*. Therefore, as shown in FIG. 4, the recessed portions 111 to 118 are disposed at positions different from those between the gas release valve 110*a* and the junction portion 130, and between each of the bulging portions 110*d* and 110*e* and the junction portion 130. For example, the recessed portion 115 does not extend between the gas release valve 110*a* and the junction portion 130 (and the periphery portion 110*f*) on the plus side in the Y axis direction. The recessed portion 116 does not extend between the gas release valve 110*a* and the junction portion 130 (and the periphery portion 110*f*) on the minus side in the Y axis direction. The same applies to the recessed portions 117 and 118. The recessed portions 111 and 115 do not extend between the bulging portion 110*d* and the junction portion 130 (and the periphery portion 110*f*) on the plus side in the Y axis direction. The recessed portions 112 and 116 do not extend between the bulging portion 110*d* and the junction portion 130 (and the periphery portion 110*f*) on the minus side in the Y axis direction. The same applies to the bulging portion 110*e* side.

As shown in FIG. 4, the recessed portions 111 to 118 are disposed so as to overlap with the internal space of the case 100 as viewed from the normal direction to the outer surface of the lid 110. That is, the recessed portions 111 to 118 are disposed immediately above the inner space (internal space S shown in FIG. 4(*b*)) of the case body 120 in which the electrode assembly 400 and the like is housed, so that the recessed portions 111 to 118 are disposed so as to overlap with the internal space S as viewed from the Z axis direction.

In the present embodiment, the recessed portions 111 to 118 are disposed in line symmetry with respect to the center lines of the lid 110 in the X axis direction and the Y axis direction, and in point symmetry with respect to the central position of the lid 110, but the disposing positions and shapes and the like of the recessed portions 111 to 118 are not particularly limited as long as these satisfy the above. For example, the recessed portion 111 or 112 may more slightly move or extend to the plus side in the X axis direction, may be composed of a plurality of groove portions arranged in the X axis direction, may more slightly extend in the Y axis direction, or may be slightly inclined with respect to the X axis direction. The recessed portions 115 and 116 and the like may not be provided. The recessed portion 111 and the recessed portion 115 may be integrated with each other without the bulging portion 110*d* being provided. The same applies to the other recessed portions.

[2.3 Description of Configuration of Protrusions 111*a* to 118*a*]

The protrusions 111*a* to 118*a* are protrusions (projected portions projected from the inner surface) formed on the inner surface (the surface on the minus side in the Z axis direction) of the lid 110, and are disposed so as to extend along the recessed portions 111 to 118. Specifically, each of the protrusions 111*a* to 118*a* has the same length as that of each of the recessed portions 111 to 118, and is disposed so as to face each of the recessed portions 111 to 118. This makes it possible to suppress the lid 110 from becoming thin even if the recessed portions 111 to 118 are formed in the lid 110.

That is, the protrusions 111*a* to 118*a* are disposed along and adjacent to the periphery portion 110*f*, and the inner surfaces thereof come into contact with the upper end portion of the case body 120. For example, the protrusion 111a is disposed at the same position as that of the recessed portion 111 in the Y axis direction (on the back side of the recessed portion 111) along the periphery portion 110f, and the minus side thereof in the Y axis direction comes into contact with the inner surface of the upper end portion of the case body 120 on the plus side in the Y axis direction. The protrusion 112a is disposed at the same position as that of the recessed portion 112 in the Y axis direction (on the back side of the recessed portion 112) along the periphery portion 110f, and the plus side thereof in the Y axis direction comes into contact with the inner surface of the upper end portion of the case body 120 on the minus side in the Y axis direction. The same applies to the other protrusions.

The protrusions 111a to 118a can be formed when the recessed portions 111 to 118 are formed in the lid 110. For example, when the outer surface of the lid 110 is recessed by press working to form the recessed portions 111 to 118, positions facing the recessed portions 111 to 118 in the inner surface of the lid 110 rise, so that the rising positions provide the protrusions 111a to 118a. The method for forming the protrusions 111a to 118a is not limited to the above, and any processing may be performed to form the protrusions.

The disposing positions and shapes and the like of the protrusions 111a to 118a are not particularly limited. For example, the protrusion 111a or 112a may more slightly move or extend to the plus side in the X axis direction, may be composed of a plurality of protrusions arranged in the X axis direction, may more slightly extend in the Y axis direction, or may be slightly inclined with respect to the X axis direction. The protrusions 115a and 116a and the like may not be provided. The protrusion 111a and the protrusion 115a may be integrated with each other. The same applies to the other protrusions. In the present embodiment, the protrusions 111a to 118a have a rectangular cross section (cross section cut in a YZ plane), but the cross sectional shape of each of the protrusions 111a to 118a may be a triangular, trapezoidal, polygonal, semicircular, semielliptical, or semielliptical shape, and is not particularly limited.

3 Description of Effects

As described above, in the energy storage device 10 according to the embodiment of the present invention, the junction portion 130 for joining the case body 120 and the lid 110 to each other is formed in the case 100, and the lid 110 includes the recessed portions 111 to 118 disposed along and adjacent to the junction portion 130 without being disposed between the electrode terminal (the positive electrode terminal 200 and the negative electrode terminal 300) and the junction portion 130.

Thus, the recessed portions 111 to 118 are formed in the vicinity of the junction portion 130 of the lid 110 along the junction portion 130, whereby the recessed portions 111 to 118 along the junction portion 130 absorb the tilt of the lid 110 even if the first side of the lid 110 is joined to the case body 120 and the lid 110 tilts, to allow the tilt of the lid 110 to be suppressed. In particular, when the lid 110 is joined to the case body 120 by welding, the junction portion melts and shrinks, so that the lid 110 tilts with respect to the case body 120, which provides a high effect of forming the recessed portions 111 to 118. Even if the case 100 repeatedly expands and contracts due to a change in the internal pressure of the case 100 after joining, the recessed portions 111 to 118 can absorb a force due to the expansion and contraction of the case 100. When the internal pressure of the case 100 rises, the recessed portions 111 to 118 can relieve the direct transmission of a stress applied to the lid 110 to the junction portion 130.

Meanwhile, if a recessed portion is formed lateral to the position where the electrode terminal is disposed in the lid 110 (between the electrode terminal and the junction portion 130), a force is applied to the lid 110 during processing of the recessed portion, so that the flatness of the surface of the lid 110 on which the electrode terminal is disposed may not be secured. Therefore, the recessed portions 111 to 118 are not formed lateral to the electrode terminal (between the electrode terminal and the junction portion 130), whereby the flatness of the surface of the lid 110 on which the electrode terminal is disposed can be secured. When the electrode terminal is fixed to the lid 110, the portion of the lid 110 to which the electrode terminal is fixed may be suppressed from bending, expanding, and contracting even if the recessed portions 111 to 118 are not formed lateral to the electrode terminal. These make it possible to accurately configure the energy storage device 10.

The recessed portions 111 to 118 formed in the lid 110 are disposed so as not to overlap with the electrode terminal as viewed from the extending direction of the recessed portions. When the recessed portions 111 to 118 are disposed so as to overlap with the electrode terminal (so as to intersect with the electrode terminal when the recessed portions 111 to 118 extend) as viewed from the extending direction of the recessed portions, the recessed portions 111 to 118 may have an influence on the flatness of the surface of the lid 110 on which the electrode terminal is disposed. Therefore, the recessed portions 111 to 118 are disposed so as not to overlap with the electrode terminal as viewed from the extending direction, which makes it possible to suppress the influence of the recessed portions 111 to 118 on the flatness of the surface of the lid 110 on which the electrode terminal is disposed. This makes it possible to accurately configure the energy storage device 10.

The recessed portions 111 to 118 formed in the lid 110 are disposed so as not to overlap with the gas release valve 110a as viewed from the extending direction of the recessed portions. When the recessed portions 111 to 118 are disposed so as to overlap with the gas release valve 110a (so as to intersect with the gas release valve 110a when the recessed portions 111 to 118 extend) as viewed from the extending direction of the recessed portions, the recessed portions 111 to 118 may have an influence on the opening pressure (actuation pressure) of the gas release valve 110a. Therefore, the recessed portions 111 to 118 are disposed so as not to overlap with the gas release valve 110a as viewed from the extending direction, which makes it possible to suppress the influence of the recessed portions 111 to 118 on the opening pressure of the gas release valve 110a. This makes it possible to accurately configure the energy storage device 10.

The recessed portions 111 to 118 formed in the lid 110 are disposed at positions different from those between the gas release valve 110a and the junction portion 130. The gas release valve 110a is generally formed by decreasing the thickness of the lid 110, so that, if a recessed portion is formed lateral to the gas release valve 110a (between the gas release valve 110a and the junction portion 130), the recessed portion may have an influence on the processing accuracy of the gas release valve 110a. Therefore, the recessed portions 111 to 118 are not formed lateral to the gas release valve 110a, so that the processing accuracy of the gas release valve 110a can be secured. This makes it possible to accurately configure the energy storage device 10.

The recessed portions 111 to 118 formed in the lid 110 are formed in the outer surface of the lid 110, and the protrusions 111*a* to 118*a* extending along the recessed portions 111 to 118 are formed on the inner surface of the lid 110. That is, when the outer surface of the lid 110 is recessed to form the recessed portions 111 to 118, the inner surface of the lid 110 can be projected to form the protrusions 111*a* to 118*a* along the recessed portions 111 to 118. Therefore, by using the protrusions 111*a* to 118*a* to position the lid 110 and the case body 120, the lid 110 can be positioned and joined to the case body 120. When the lid 110 is joined to the case body 120, the case body 120 is pressed at the positions where the protrusions 111*a* to 118*a* are disposed, whereby a welded location can be easily pressed. These make it possible to accurately configure the energy storage device 10.

The recessed portions 111 to 118 formed in the lid 110 are formed by groove portions extending along the junction portion 130. Thus, the recessed portions 111 to 118 can be easily formed by processing the groove portions extending along the junction portion 130 in the lid 110. This makes it possible to easily and accurately configure the energy storage device 10.

The recessed portions 111 to 118 formed in the lid 110 are disposed so as to overlap with the internal space of the case 100 as viewed from the normal direction of the outer surface of the lid 110. Thus, the recessed portions 111 to 118 are disposed so as to overlap with the internal space of the case 100, whereby the tilt of the lid 110 can be easily absorbed by the recessed portions 111 to 118 when the case body 120 and the lid 110 are joined to each other. After joining, the recessed portions 111 to 118 can easily absorb the force due to the expansion and contraction of the case 100. This makes it possible to accurately configure the energy storage device 10.

4 Description of Modification Examples of Embodiment

Modification Example 1

Figure 5:
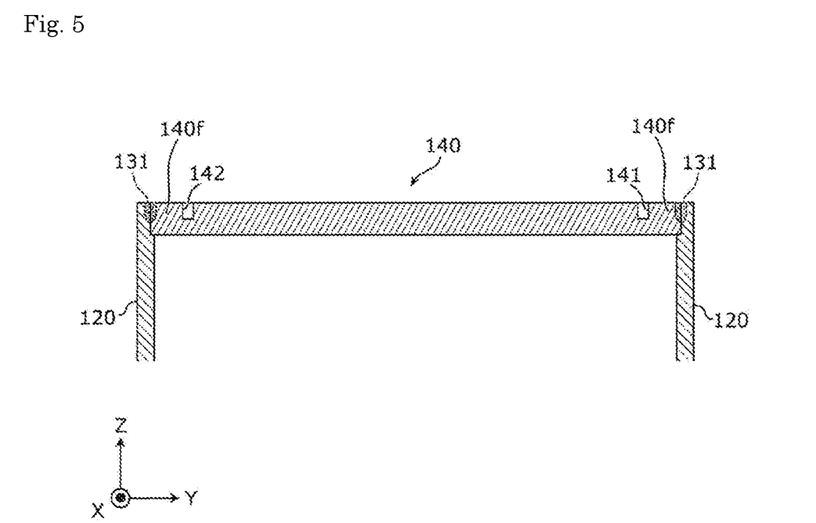
FIG. 5 is a cross-sectional view showing a configuration in which a lid according to modification example 1 of the embodiment is joined to a case body.

Next, modification example 1 of the embodiment will be described. FIG. 5 is a cross-sectional view showing a configuration in which a lid 140 according to the modification example 1 of the present embodiment is joined to a case body 120. FIG. 5 corresponds to FIG. 4(*b*).

As shown in FIG. 5, the lid 140 in the present modification example includes a periphery portion 140*f* in place of the periphery portion 110*f* of the lid 110 in the embodiment. The periphery portion 140*f* is not a stepped portion (thin-walled portion) unlike the periphery portion 110*f* in the embodiment. Therefore, when the lid 140 is disposed in the case body 120, the periphery portion 140*f* is deeply fitted into the case body 120, so that the lid 140 in the present modification example does not include the protrusions 111*a* to 118*a* in the embodiment. However, also in the present modification example, the lid 140 may include the same protrusions as the protrusions 111*a* to 118*a* in the embodiment. That is, on the inner surface of the lid 140, protrusions may be formed so as to extend along recessed portions 141 and 142 and the like. The recessed portions 141 and 142 and the like included in the lid 140 in the present modification example have the same configuration as that of the recessed portions 111 and 112 and the like in the embodiment.

In such a configuration, the periphery portion 140*f* of the lid 140 is fitted into the case body 120, to join the case body 120 and the periphery portion 140*f* to each other, thereby forming a junction portion 131 on the upper surface of the case. That is, in the embodiment, the junction portion 130 is formed on the side surface of a case 100 by irradiating the case 100 with laser light from the lateral side, but in the present modification example, the case is irradiated with laser light from above, to form the junction portion 131 on the upper surface of the case. The other configuration of the present modification example is similar to that of the embodiment, and the detailed description thereof will be omitted.

Thus, in the present modification example, the junction portion 131 for joining the case body 120 and the lid 140 to each other is formed on the surface of the case on the electrode terminal side, and the lid 140 includes the recessed portions 141 and 142 disposed along and adjacent to the junction portion 131 without being disposed between the electrode terminal and the junction portion 131. The lid 140 includes a gas release valve (not shown). The recessed portions 141 and 142 and the like are disposed so as not to overlap with the gas release valve as viewed from the extending direction of the recessed portions 141 and 142 and the like, and are disposed at positions different from those between the gas release valve and the junction portion 131. Furthermore, the recessed portions 141 and 142 and the like are formed by groove portions extending along the junction portion 131, and are disposed so as to overlap with the internal space of the case as viewed from the normal direction of the outer surface of the lid 140.

As described above, even when the junction portion 131 is formed on the upper surface (the surface on the electrode terminal side) of the case, the lid 140 may tilt while the case body 120 and the lid 140 are joined to each other, whereby the energy storage device according to the present modification example can exhibit the same effects as those of the embodiment. In particular, when the junction portion 131 is formed on the upper surface of the case, and a first side of the lid 140 is joined to the case body 120, the lid 140 tends to tilt, whereby the effects of the present modification example are high. The present modification example makes it unnecessary to process the periphery portion 140*f* into a step shape or to form the protrusions 111*a* to 118*a* as in the embodiment, whereby the lid 140 can be easily prepared.

Modification Example 2

Figure 6:
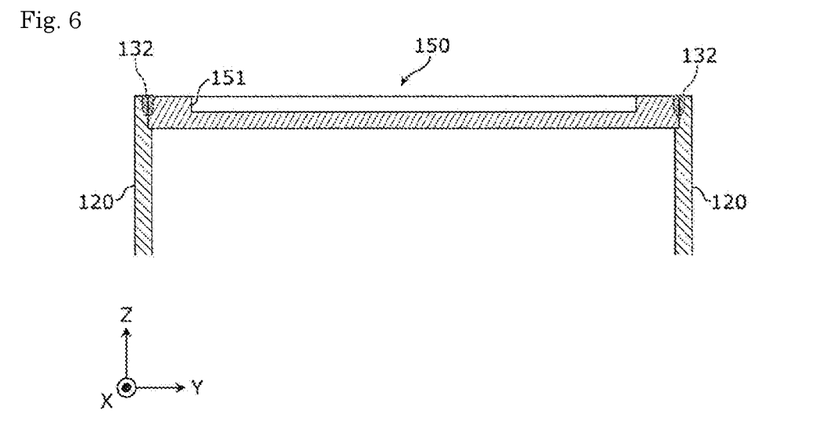
FIG. 6 is a cross-sectional view showing a configuration in which a lid according to modification example 2 of the embodiment is joined to a case body.

Next, modification example 2 of the embodiment will be described. FIG. 6 is a cross-sectional view showing a configuration in which a lid 150 according to the modification example 2 of the present embodiment is joined to a case body 120. FIG. 6 corresponds to FIG. 4(*b*).

As shown in FIG. 6, the lid 150 in the present modification example includes a recessed portion 151 and the like in place of the recessed portions 141 and 142 and the like of the lid 140 in the modification example 1. The recessed portion 151 is a recessed portion formed by continuously recessing the outer surface of the lid 150 in a Y axis direction from the position of the recessed portion 141 to the position of the recessed portion 142 in the modification example 1. A junction portion 132 in the present modification example has the same configuration as that of the junction portion 131 in the modification example 1. The other configurations of the present modification example are also the same as those of the modification example 1, and the detailed description thereof will be omitted.

As described above, the energy storage device according to the present modification example can exhibit the same effects as those of the modification example 1. In particular, in the present modification example, the number of recessed portions to be formed can be reduced, so that the lid 150 can be easily prepared.

Modification Example 3

Figure 7:
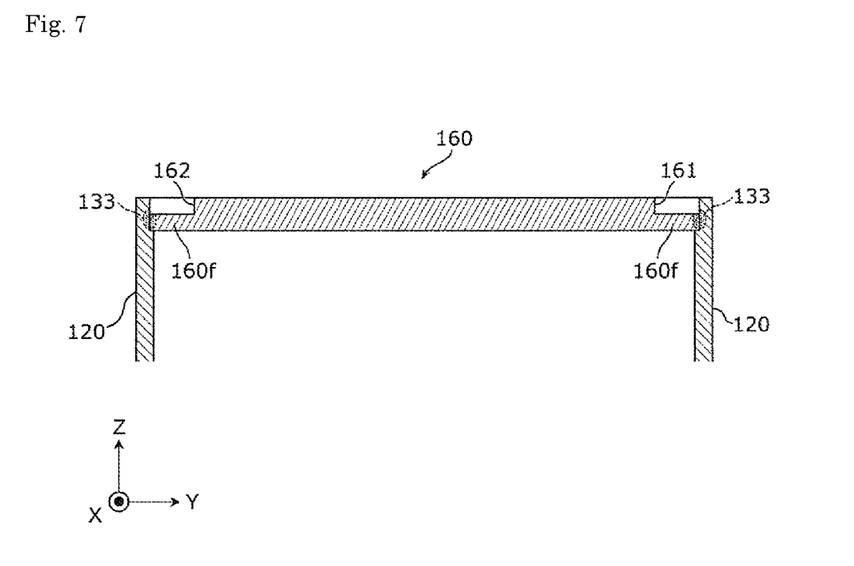
FIG. 7 is a cross-sectional view showing a configuration in which a lid according to modification example 3 of the embodiment is joined to a case body.

Next, modification example 3 of the embodiment will be described. FIG. 7 is a cross-sectional view showing a configuration in which a lid 160 according to the modification example 3 of the present embodiment is joined to a case body 120. FIG. 7 corresponds to FIG. 4(*b*).

As shown in FIG. 7, the lid 160 in the present modification example includes recessed portions 161 and 162 and the like in place of the recessed portions 141 and 142 and the like of the lid 140 in the modification example 1. The recessed portion 161 is a recessed portion (stepped portion) formed by continuously recessing the outer surface of the lid 160 in a Y axis direction from the position of the recessed portion 141 in the modification example 1 to an end edge of the lid 160 on a plus side in the Y axis direction. The recessed portion 162 is a recessed portion (stepped portion) formed by continuously recessing the outer surface of the lid 160 in the Y axis direction from the position of the recessed portion 142 in the modification example 1 to an end edge of the lid 160 on a minus side in the Y axis direction. As a result, the lid 160 includes a thin-walled periphery portion 160*f*, and a junction portion 133 for joining the periphery portion 160*f* and the case body 120 to each other is formed. The other configuration of the present modification example is similar to that of the modification example 1, and the detailed description thereof will be omitted.

As described above, the energy storage device according to the present modification example can exhibit the same effects as those of the modification example 1. In particular, in the present modification example, it is only necessary to form the recessed portions having a simple shape such as the recessed portions 161 and 162, whereby the lid 160 can be easily prepared.

Other Modification Examples

Although the energy storage devices according to the embodiment of the present invention and the modification example of the embodiment have been described above, the present invention is not limited to the embodiment and modification examples of the embodiment. That is, the embodiment and the modification examples of the embodiment disclosed in this specification are only for an exemplifying purpose in all aspects, and are not limited. The scope of the present invention is designated by Claims, and all modification examples which fall within the meaning and the scope equivalent to Claims are included in the scope of the present invention.

In the embodiment and the modification examples of the embodiment, the outer surface of the lid of the case is recessed to form recessed portions such as recessed portions 111 to 118. However, the inner surface of the lid of the case may be recessed to form the recessed portions.

In the embodiment and the modification examples of the embodiment, the recessed portions such as the recessed portions 111 to 118 formed in the lid of the case form thin-walled portions each having a smaller thickness than that of the adjacent portion. However, the recessed portions do not have to form the thin-walled portions. That is, even if the recessed portions are formed, the lid may not be thin.

In the embodiment and the modification examples of the embodiment, the junction portion such as the junction portion 130 is a welded portion in which the case body 120 and the lid are joined by welding. However, the method for joining the case body 120 and the lid to each other is not limited to welding. For example, the junction portion may be a portion in which the case body 120 and the lid are bonded by an adhesive or the like, or welded by thermal welding or the like. Even in this case, when the lid tilts during joining, the lid is suppressed from tilting, to allow the energy storage device to be accurately configured.

In the embodiment and the modification examples of the embodiment, the lid includes the gas release valve 110*a*, and the recessed portions such as the recessed portions 111 to 118 are disposed so as not to overlap with the gas release valve 110*a* as viewed from the extending direction of the recessed portions. However, the recessed portions may be disposed so as to overlap with the gas release valve 110*a* as viewed from the extending direction of the recessed portions, or the lid may not include the gas release valve 110*a*.

In the embodiment and the modification examples of the embodiment, the recessed portions such as the recessed portions 111 to 118 formed in the lid of the case are disposed at positions different from those between the gas release valve 110*a* and the junction portion such as the junction portion 130. However, the recessed portions may be disposed between the gas release valve 110*a* and the junction portion.

A form constructed by arbitrarily combining the constituent elements included in the embodiment and the modification examples of the embodiment is also included in the scope of the present invention.

The present invention can be realized not only as an energy storage device but also as a case or a lid of the case which are included in the energy storage device.

INDUSTRIAL APPLICABILITY

The present invention can be applied to an energy storage device such as a lithium ion secondary battery.

DESCRIPTION OF REFERENCE SIGNS

10: energy storage device
100: case
110, 140, 150, 160: lid
110*a*: gas release valve
110*b*, 110*c*: opening portion
110*d*, 110*e*: bulging portion
110*f*, 140*f*, 160*f*: periphery portion
111 to 118, 141, 142, 151, 161, 162: recessed portion
111*a* to 118*a*: protrusion
120: case body
130, 131, 132, 133: junction portion
200: positive electrode terminal
210, 310: shaft portion
300: negative electrode terminal
400: electrode assembly
500: positive electrode current collector
510, 610: opening portion
600: negative electrode current collector

The invention claimed is:
1. An energy storage device comprising:
a case including a case body and a lid;
an electrode terminal fixed to the lid; and
an electrode assembly housed in the case,
wherein a junction portion for joining the ease body and the lid to each other is formed on an outer surface of the lid which is opposite to an inner surface of the lid, the inner surface facing the electrode assembly, wherein the lid includes a recessed portion disposed along and adjacent to the junction portion without being disposed between the electrode terminal and the junction portion, and wherein the recessed portion is formed on the outer surface of the lid.

2. The energy storage device according to claim 1, wherein the lid further includes a gas release valve, and the recessed portion is disposed so as not to overlap with the gas release valve as viewed from an extending direction of the recessed portion.

3. The energy storage device according to claim 2, wherein the recessed portion is disposed at a position different from that between the gas release valve and the junction portion.

4. The energy storage device according to claim 1, wherein a protrusion extending along the recessed portion is formed on the inner surface of the lid.

5. The energy storage device according to claim 1, wherein the recessed portion is formed by a groove portion extending along the junction portion.

6. The energy storage device according to claim 1, wherein the recessed portion is disposed so as to overlap with an internal space of the case as viewed from a normal direction of the outer surface of the lid.

7. The energy storage device according to claim 1, wherein the lid does not include any recessed portion overlapped with the electrode terminal as viewed from an extending direction of the recessed portion and a direction orthogonal to the extending direction of the recessed portion.

8. The energy storage device according to claim 1, wherein the lid includes a gas release valve, wherein the lid does not include any recessed portion overlapped with the gas release valve as viewed from an extending direction of the recessed portion and a direction orthogonal to the extending direction of the recessed portion, wherein the recessed portion is disposed on the outer surface of the lid which is opposite to the inner surface of the lid, the inner surface facing the electrode assembly, wherein the recessed portion is disposed at a position different from that between the gas release valve and the junction portion, wherein the lid includes a short side of the lid as viewed from an arrangement direction of the case body and the lid and a long side of the lid as viewed from the arrangement direction of the case body and the lid, and wherein the extending direction is substantially parallel to the long side of the lid.

9. The energy storage device according to claim 8, wherein the lid does not include any recessed portion overlapped with the electrode terminal as viewed from the extending direction of the recessed portion and the direction orthogonal to the extending direction of the recessed portion.

10. The energy storage device according to claim 1, wherein the lid is devoid of any recessed portion overlapped with the electrode terminal as viewed from an extending direction of the recessed portion and a direction orthogonal to the extending direction of the recessed portion.

11. The energy storage device according to claim 1, wherein the lid includes a gas release valve, wherein the lid is devoid of any recessed portion overlapped with the gas release valve as viewed from an extending direction of the recessed portion and a direction orthogonal to the extending direction of the recessed portion.

12. An energy storage device comprising:

a case including a case body and a lid; and an electrode terminal fixed to the lid, wherein a junction portion for joining the case body and the lid to each other is formed on a surface of the case adjacent to the electrode terminal, wherein the lid includes a first recessed portion disposed along and adjacent to the junction portion, and wherein the lid does not include any recessed portion overlapped with the electrode terminal as viewed from an extending direction of the first recessed portion and a direction orthogonal to the extending direction of the first recessed portion.

13. The energy storage device according to claim 12, further comprising:

an electrode assembly housed in the case, wherein the lid includes a gas release valve, wherein the first recessed portion is not disposed between the electrode terminal and the junction portion, wherein the lid does not include any recessed portion overlapped with the gas release valve as viewed from the extending direction of the first recessed portion and the direction orthogonal to the extending direction of the first recessed portion, wherein the first recessed portion is disposed on an outer surface of the lid which is opposite to an inner surface of the lid, the inner surface facing the electrode assembly, wherein the first recessed portion is disposed at a position different from that between the gas release valve and the junction portion, wherein the lid includes a short side of the lid as viewed from an arrangement direction of the case body and the lid and a long side of the lid as viewed from the arrangement direction of the case body and the lid, and wherein the extending direction is substantially parallel to the long side of the lid.

14. The energy storage device according to claim 12, wherein the case includes short side surfaces and long side surfaces, and wherein the direction orthogonal to the extending direction of the first recessed portion is an oppositely facing direction of long side surfaces of the case.

15. The energy storage device according to claim 12, wherein the lid is devoid of any recessed portion overlapped with the electrode terminal as viewed from the extending direction of the first recessed portion and the direction orthogonal to the extending direction of the first recessed portion.

16. The energy storage device according to claim 12, wherein the lid includes a gas release valve, and wherein the lid is devoid of any recessed portion overlapped with the gas release valve as viewed from the extending direction of the first recessed portion and the direction orthogonal to the extending direction of the first recessed portion.

17. An energy storage device comprising:

a case including a case body and a lid;

an electrode terminal fixed to the lid; and
an electrode assembly housed in the case,
wherein a junction portion for joining the case body and the lid to each other is formed on a surface of the case adjacent to the electrode terminal,
wherein the lid includes:
  a gas release valve; and
  a first recessed portion disposed along and adjacent to the junction portion without being disposed between the electrode terminal and the junction portion,
wherein the lid does not include any recessed portion overlapped with the gas release valve as viewed from an extending direction of the first recessed portion and a direction orthogonal to the extending direction of the first recessed portion,
wherein the first recessed portion is disposed on an outer surface of the lid which is opposite to an inner surface of the lid, the inner surface facing the electrode assembly,
wherein the first recessed portion is disposed at a position different from that between the gas release valve and the junction portion,
wherein the lid includes a short side of the lid as viewed from an arrangement direction of the case body and the lid and a long side of the lid as viewed from the arrangement direction of the case body and the lid, and
wherein the extending direction is substantially parallel to the long side of the lid.

18. The energy storage device according to claim 17,
wherein the case includes short side surfaces and long side surfaces, and
wherein the direction orthogonal to the extending direction of the first recessed portion is an oppositely facing direction of long side surfaces of the case.

19. The energy storage device according to claim 17, wherein the lid is devoid of any recessed portion overlapped with the electrode terminal as viewed from the extending direction of the first recessed portion and the direction orthogonal to the extending direction of the first recessed portion.

20. The energy storage device according to claim 17, wherein the lid is devoid of any recessed portion overlapped with the gas release valve as viewed from the extending direction of the first recessed portion and the direction orthogonal to the extending direction of the first recessed portion.

* * * * *